United States Patent
Tsubaki

(10) Patent No.: US 9,294,675 B2
(45) Date of Patent: Mar. 22, 2016

(54) IMAGE PICKUP APPARATUS CAPABLE OF DETECTING MOTION VECTOR, METHOD OF CONTROLLING THE SAME, AND STORAGE MEDIUM

(71) Applicant: CANON KABUSHIKI KAISHA, Tokyo (JP)

(72) Inventor: Hidetoshi Tsubaki, Kawasaki (JP)

(73) Assignee: CANON KABUSHIKI KAISHA (JP)

(*) Notice: Subject to any disclaimer, the term of this patent is extended or adjusted under 35 U.S.C. 154(b) by 0 days.

(21) Appl. No.: 14/547,695

(22) Filed: Nov. 19, 2014

(65) Prior Publication Data
US 2015/0138380 A1 May 21, 2015

(30) Foreign Application Priority Data
Nov. 20, 2013 (JP) ................................. 2013-239806

(51) Int. Cl.
*H04N 5/232* (2006.01)
*H04N 5/14* (2006.01)

(52) U.S. Cl.
CPC ........... *H04N 5/23254* (2013.01); *H04N 5/144* (2013.01); *H04N 5/232* (2013.01); *H04N 5/23248* (2013.01); *H04N 5/23258* (2013.01)

(58) Field of Classification Search
CPC .......... H04N 5/23254; H04N 5/23248; H04N 5/23258; H04N 5/232
See application file for complete search history.

(56) References Cited

U.S. PATENT DOCUMENTS

| | | | | |
|---|---|---|---|---|
| 2002/0172287 A1* | 11/2002 | Kim | ...................... | G06T 7/2073 375/240.16 |
| 2007/0070060 A1* | 3/2007 | Kagawa | .................... | G06T 1/00 345/418 |
| 2009/0109342 A1* | 4/2009 | Heng | .................... | H04N 19/198 348/699 |
| 2009/0180032 A1* | 7/2009 | Heng | .................... | G06T 7/2013 348/699 |
| 2010/0020244 A1* | 1/2010 | Mitsuya | ................. | G06T 7/2026 348/699 |
| 2012/0162454 A1* | 6/2012 | Park | ........................ | H04N 5/145 348/208.6 |
| 2012/0170660 A1* | 7/2012 | Novotny | ................. | H04N 19/53 375/240.16 |
| 2012/0194685 A1 | 8/2012 | Kawakami et al. | | |
| 2013/0070971 A1* | 3/2013 | Kunihiro | ............... | G06T 7/0016 382/107 |

FOREIGN PATENT DOCUMENTS

| | | |
|---|---|---|
| JP | 2011-164905 A | 8/2011 |
| JP | 2012-160886 A | 8/2012 |

* cited by examiner

*Primary Examiner* — Nicholas Giles
*Assistant Examiner* — Abdelaaziz Tissire
(74) *Attorney, Agent, or Firm* — Rossi, Kimms & McDowell LLP

(57) ABSTRACT

An image pickup apparatus capable of detecting a motion vector and selecting a vector search method which enables effects to be always obtained in various usages of a camera, taking into account load balancing with the performance. One input image is set as a reference image, and the other input image is set as a search target image. Using a template having a predetermined size on the reference image, a motion vector is detected from the search target image. A determination index associated with frequency of occurrence of parallax conflict is calculated. When the determination index is not larger than a threshold value, a first detection method using a single layer is selected, whereas when the determination index is larger than the threshold value, a second detection method using a plurality of layers is selected.

10 Claims, 8 Drawing Sheets

FIG. 3A1
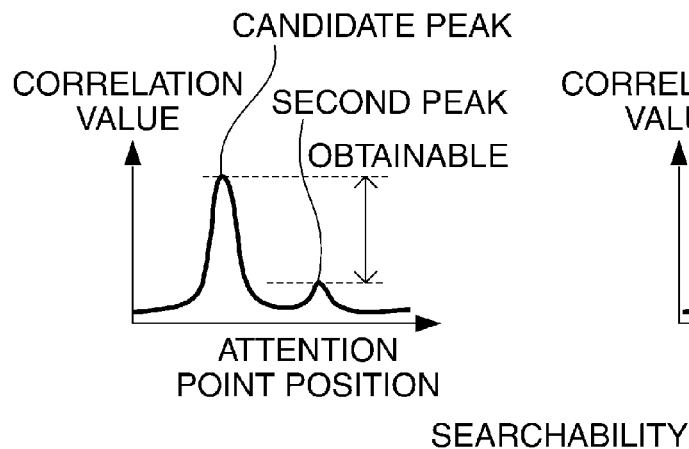
SEARCHABILITY
FIG. 3A2
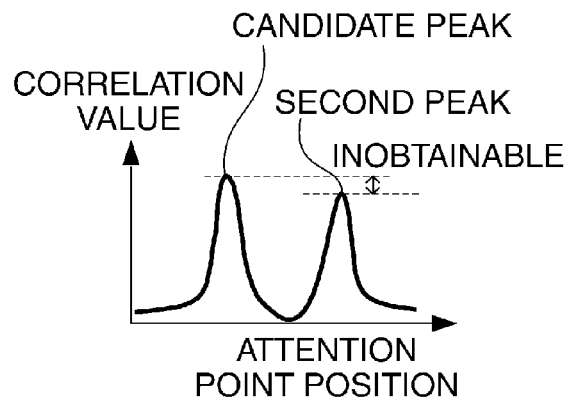
FIG. 3B
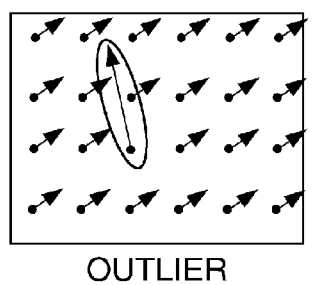
OUTLIER
FIG. 3C
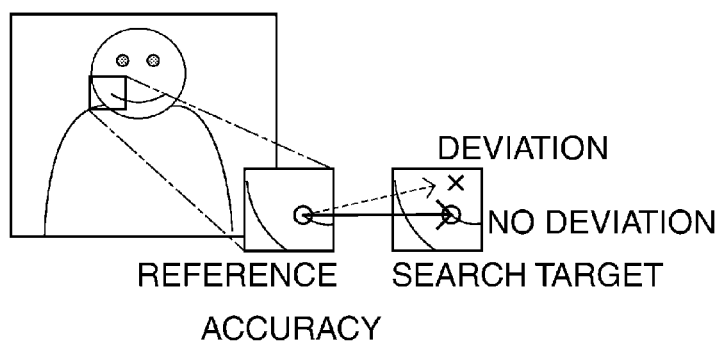
ACCURACY

UNREDUCED IMAGE
(LOW RATIO OF SIZE
REDUCTION)

REDUCED IMAGE

NEAR  FAR

ATTENTION POINT

IMAGE PICKUP APPARATUS CAPABLE OF DETECTING MOTION VECTOR, METHOD OF CONTROLLING THE SAME, AND STORAGE MEDIUM

BACKGROUND OF THE INVENTION

1. Field of the Invention

The present invention relates to an image pickup apparatus that is capable of detecting a motion vector, a method of controlling the same, and a storage medium, and more particularly to an image pickup apparatus capable of detecting a motion vector, which is equipped with a corresponding point-searching technique for searching for corresponding points or motion vectors between two or more images, a method of controlling the same, and a storage medium.

2. Description of the Related Art

In corresponding point search and motion vector search between moving image frames, template matching (TM) is valued as an effective method. Further, image pickup apparatuses in recent years are required to be improved in vector search performance (searchability ratio, outlier ratio, and accuracy) as the number of pixels increases and the performance is improved. The searchability ratio is a ratio of possibility of only one peak being found on a correlation value map, the outlier ratio is a ratio of a large error in a motion vector output by TM as a correct value, and the accuracy is an index of deviation, which is not higher in degree of deviation than the outlier, from a true value.

In general TM, a search range, a template size, various determination threshold values, and a ratio of size reduction of an input image are basic design values which influence the performance. On the design, first, the search range is determined by a magnitude of a motion of an object between images. In recent years, there has been proposed a method of reducing the search range to thereby not only reduce the amount of calculation for the search, but also improve the search performance (see e.g. Japanese Patent Laid-Open Publication No. 2012-160886).

However, the above-mentioned approach is effective only in limited cases, such as a case where prediction of a motion can be performed, and a case where an auxiliary sensing unit, such as a posture sensor, can be used. In most cases, this approach cannot be necessarily introduced.

The search range is required to be increased to cope with a large shake. However, if the search range is increased, this causes a problem that a plurality of positions each having a peak of a correlation value are likely to be generated. To reduce the number of peaks, it is necessary to increase the size of the template to make peak detection difficult to be influenced by a repeated pattern, a flat portion, etc.

Further, the various determination threshold values include threshold values for determining the searchability ratio and the outlier ratio, but the threshold values depend on an object image, and hence it is difficult to handle the values on the design as desired with a view to improving the performance.

On the other hand, by performing the motion vector search after the size of the template is increased relative to the size of an image through reduction of the size of the image, it is possible to reduce the search load. However, as the ratio of size reduction is made larger (as the image after size reduction is smaller), detailed information included in the original image is lost, and hence the search accuracy is lowered. For this reason, in a case where an original input image includes sufficiently detailed information, higher accuracy can be obtained by performing the motion vector search using an input image formed by reducing the original input image by a lower ratio of size reduction.

However, if the motion vector search is performed using a large template, and further, using an input image formed by a low ratio of size reduction, this not only increases the amount of calculation, but also brings about negative effects, such as increase in memory occupancy ratio, oppression of a transport bus band, and increased power consumption. Therefore, the search using an input image formed by a high ratio of size reduction is desired if possible. In this case, the image pickup apparatus is required to cope with camera shake and photographing performed while walking, using e.g. an anti-shake function. In recent years, when considering, as a whole, various cases where an increasing variety of applications use a motion vector, there are few problems even in the motion vector search using an input image reduced by a high ratio of size reduction. This is because as the ratio of size reduction is lower, generally, higher accuracy can be obtained, but an object as a search target changes in its appearance due to influences of a parallax generated by parallel movement of a camera or an object, a motion of a non-rigid body, such as a human body, rolling shutter distortion, and distortion aberration of an optical system, whereby detailed information included in the input image is changed. Therefore, even when the search is performed using an input image formed by a lower ratio of size reduction and also using a large template, sufficient accuracy cannot be necessarily obtained, which reduces a merit of the search using an input image formed by a lower ratio of size reduction. Particularly, parallax conflict caused by influences of a plurality of parallaxes generated within the template has a large influence on reduction of the search performance. However, taking into account each of the cases where the applications use a motion vector, there is room for the improvement of performance. A parallax has a small influence on the search performance in cases where a camera shake having a small shake angle is caused and photographing of an object at a long distance is performed, which have been targeted by the conventional anti-shake technique. Therefore, it is possible to improve the accuracy by using an input image lower in ratio of size reduction, such as an unreduced image which is not reduced in size.

Further, as a counter-measure for solving a problem caused by parallax conflict, there has been proposed a hierarchical layer search process for performing the search using a relatively large template first, and making the template as small as possible for a final search (see e.g. Japanese Patent Laid-Open Publication No. 2011-164905).

However, it is difficult to employ this process because of increased difficulty in real-time processing due to complexity thereof for constructing hierarchical images and the like, too large a circuit scale, and too high a memory occupancy ratio. It is necessary to make a compromise depending on restrictions on the system, and for example, by reducing beforehand a lowest layer-image lowest in ratio of size reduction, which is used as a base image. If the hierarchical layer search is performed using a reduced final base image, a single-layer vector search (single layer search) using an unreduced input image may be higher in vector search accuracy than the hierarchical layer search, depending on photographing conditions. Further, in a case where there are substantially no parallaxes generated only by a camera shake, the complicated function of the hierarchical layer search performed assuming that a parallax is generated do not necessarily correctly function with a large number of threshold settings, and the hierarchical layer search is lower in performance rather than the simple single layer search even if there is no difference in ratio of size reduction of the base image.

As described above, although the hierarchical layer search has been proposed as a method effective in improving the performance of the vector search, advantageous effects thereof are not always obtained in various uses thereof for a camera, ranging from a use thereof accompanied by a camera shake to a use thereof for photographing while walking, and it also has a problem of negative effects, such as oppression of a transport bus band, and increased power consumption. Further, particularly in a specific photographing state, such as a state where a camera shake occurs, higher performance is sometimes obtained by performing the vector search using the simple single layer search.

SUMMARY OF THE INVENTION

The present invention provides an image pickup apparatus that is capable of detecting a motion vector and selecting a vector search method which makes it possible to always obtain advantageous effects in various uses of a camera, including a use thereof accompanied by a camera shake and a use thereof for photographing while walking, which takes into account load balancing with the performance, a method of controlling the same, and a storage medium.

In a first aspect of the present invention, there is provided an image pickup apparatus including a motion vector detection unit configured to have one of two or more input images photographed through an optical system input as a reference image, and another input image input as a search target image, and detect, with respect to a block having a predetermined size and formed by a plurality of pixels set in the reference image, a motion vector in the block from the search target image, comprising a calculation unit configured to calculate a determination index associated with frequency of occurrence of parallax conflict which is a state in which objects having different parallaxes are included in a template set to the input image, wherein in a case where the determination index calculated by the calculation unit is not larger than a threshold value, the vector detection unit selects a first detection method for detecting a motion vector using a first number of layers, whereas in a case where the determination index is larger than the threshold value, the vector detection unit selects a second detection method for detecting a motion vector using a second number of layers, the second number being larger than the first number.

In a second aspect of the present invention, there is provided an image processing apparatus including a motion vector detection unit configured to have one of two or more input images photographed through an optical system input as a reference image, and another input image input as a search target image, and detect, with respect to a block having a predetermined size and formed by a plurality of pixels set in the reference image, a motion vector in the block from the search target image, comprising a calculation unit configured to calculate a determination index associated with frequency of occurrence of parallax conflict which is a state in which objects having different parallaxes are included in a template set to the input image, wherein in a case where the determination index calculated by the calculation unit is not larger than a threshold value, the vector detection unit selects a first detection method for detecting a motion vector using a first number of layers, whereas in a case where the determination index is larger than the threshold value, the vector detection unit selects a second detection method for detecting a motion vector using a second number of layers, the second number being larger than the first number.

In a third aspect of the present invention, there is provided a method of controlling an image pickup apparatus including a motion vector detection unit configured to have one of two or more input images photographed through an optical system input as a reference image, and another input image input as a search target image, and detect, with respect to a block having a predetermined size and formed by a plurality of pixels set in the reference image, a motion vector in the block from the search target image, comprising calculating a determination index associated with frequency of occurrence of parallax conflict which is a state in which objects having different parallaxes are included in a template set to the input image, and causing the vector detection unit to select, in a case where the determination index is not larger than a threshold value, a first detection method for detecting a motion vector using a first number of layers, whereas in a case where the determination index is larger than the threshold value, a second detection method for detecting a motion vector using a second number of layers, the second number being larger than the first number.

In a fourth aspect of the present invention, there is provided a non-transitory computer-readable storage medium storing a computer-executable program for executing a method of controlling an image pickup apparatus including a motion vector detection unit configured to have one of two or more input images photographed through an optical system input as a reference image, and another input image input as a search target image, and detect, with respect to a block having a predetermined size and formed by a plurality of pixels set in the reference image, a motion vector in the block from the search target image, wherein the method comprises calculating a determination index associated with frequency of occurrence of parallax conflict which is a state in which objects having different parallaxes are included in a template set to the input image, and causing the vector detection unit to select, in a case where the determination index is not larger than a threshold value, a first detection method for detecting a motion vector using a first number of layers, whereas in a case where the determination index is larger than the threshold value, a second detection method for detecting a motion vector using a second number of layers, the second number being larger than the first number.

According to the present invention, it is possible to select the vector search method which makes it possible to always obtain advantageous effects in various uses of a camera, including a use thereof accompanied by a camera shake and a use thereof for photographing while walking, which takes into account load (a bus band, power consumption, etc.) balancing with the performance (searchability ratio, outlier ratio, and accuracy).

Further features of the present invention will become apparent from the following description of exemplary embodiments (with reference to the attached drawings).

BRIEF DESCRIPTION OF THE DRAWINGS

FIGS. 2A and 2B are diagrams useful in explaining vector search, in which FIG. 2A shows block matching which is a type of TM, and FIG. 2B shows main controllable parameters used in the vector search.

FIGS. 3A1 to 3C are diagrams useful in explaining an overview of vector search performance, in which FIGS. 3A1 and 3A2 show a searchability ratio, FIG. 3B shows an outlier ratio, and FIG. 3C shows accuracy.

FIGS. 5A to 5C are diagrams useful in explaining generation of a parallax and parallax conflict, in which FIG. 5A shows an example of an image obtained by photographing wall surfaces extending in a direction of the depth, FIG. 5B shows a case where the image pickup apparatus is moved in parallel, and FIG. 5C shows a case where the image pickup apparatus is rotated about the principal point of the optical system.

FIG. 6A to 6D are diagrams useful in explaining an influence of parallax conflict on vector accuracy, in which FIG. 6A shows an example of an image in which a person in a foreground and a background are photographed, FIG. 6B shows a case where conflict between motions of an object due to different parallaxes occurs within a template area, FIG. 6C shows an example of a vector determined to be degraded in accuracy or an outlier according to a motion of the foreground, and FIG. 6D shows an example of an image in which an outlier and portions degraded in parallax accuracy are largely generated in a result of motion vector search at a boundary area of the object in a depth direction.

FIGS. 7A and 7B are diagrams showing changes of a search range and a template size in the hierarchical vector search, in which FIG. 7A shows an example of changes of the search range in searching pyramidal image hierarchical layers from the uppermost layer toward the lowermost layer, and FIG. 7B shows an example of changes of the template size in searching the pyramidal image hierarchical layers from the uppermost layer toward the lowermost layer.

FIGS. 9A and 9B are diagrams showing switching of the search between a single layer search and a hierarchical layer search, in which FIG. 9A shows a case where the hierarchical layer search is performed using an unreduced image, and FIG. 9B shows a case where the hierarchical layer search is performed using a reduced image.

DESCRIPTION OF THE EMBODIMENTS

The present invention will now be described in detail below with reference to the accompanying drawings showing embodiments thereof.

Figure 1:
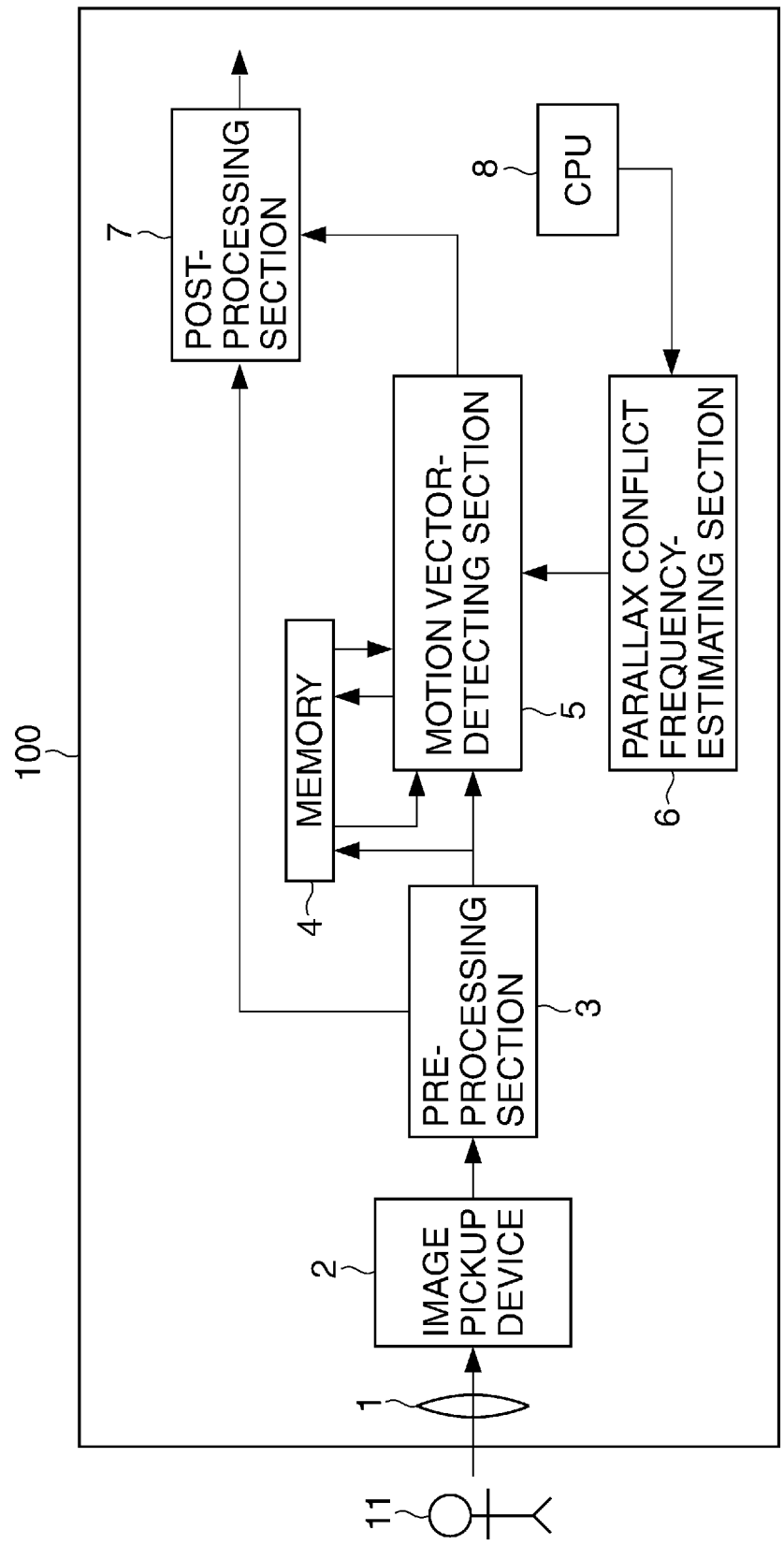
FIG. 1 is a schematic block diagram of an image pickup apparatus according to a first embodiment of the present invention.

FIG. 1 is a schematic block diagram of an image pickup apparatus according to a first embodiment of the present invention.

The image pickup apparatus, denoted by reference numeral 100, is comprised of an optical system 1, an image pickup device 2, a pre-processing section 3, a memory 4, a motion vector-detecting section 5, a parallax conflict frequency-estimating section 6, a post-processing section 7, and a CPU 8.

The optical system 1 is a component that causes light reflected from an object 11 to form an optical image on the image pickup device 2, and is comprised of a plurality of lenses and mirrors. The image pickup device 2 is an element that photoelectrically converts the optical image formed on a sensor surface thereof into an electronic image.

The pre-processing section 3 is part that obtains a digital image signal by performing basic processing on an analog image signal photoelectrically converted by the image pickup device 2, including noise elimination by correlation double sampling (CDS), exposure control by increasing a gain by automatic gain control (AGC), black level correction, and A/D conversion. The pre-processing section 3 may perform color image generation or luminance image generation e.g. by Bayer array interpolation, separately, on an image to be input to the motion vector-detecting section 5. This may be performed at a simple level for use in the vector search. Further, the pre-processing section 3 may perform filtering processing, such as low-pass and high-pass filtering processing, and gradation adjustment processing, such as tone mapping, so as to improve accuracy and robustness in motion vector detection processing. The pre-processing section 3 mainly performs pre-processing on an analog signal, and hence essential parts of the per-processing section 3 are also referred to as the AFE (analog front end). On the other hand, parts of the per-processing section 3, used in combination with a digital output sensor, are referred to as the DFE (digital front end).

The memory 4 is a memory for temporarily storing processing data including data of a pre-processed image signal generated by the pre-processing section 3.

The motion vector-detecting section 5 estimates motion vectors between images using an image signal generated by the pre-processing section 3 and a (past) image signal accumulated in the image memory 4.

The CPU 8 controls the overall operation of the image pickup apparatus 100, and controls the operations of the components by reading a control program from a memory unit, not shown, loading the control program into the memory 4, and executing the control program. The CPU (central processing unit) 8 holds a zoom state (focal length) of the image pickup apparatus 100, photographing conditions including an object distance indicative of a focused distance, and operating state of the image pickup apparatus 100 including a frame rate during photographing of a moving image, in the memory 4.

The parallax conflict frequency-estimating section 6 estimates occurrence frequency of parallax conflict, based on various sensing information, and the photographing conditions and the operating state of the image pickup apparatus, which are determined by the CPU 8, transmits information on the estimate to the motion vector-detecting section 5, or controls the operation of the motion vector-detecting section 5 based on the information on the estimate. For example, the parallax conflict frequency-estimating section 6 estimates a magnitude of a parallax generated between two or more images input to the motion vector-detecting section 5, and if it is determined that the parallax generated between the images is small, the parallax conflict frequency-estimating section 6 instructs the motion vector-detecting section 5 to perform the vector search by reducing the number of layers for the hierarchical layer search e.g. to a single layer. Alternatively or in combination, the input image may be reduced by a smaller ratio of size reduction. On the other hand, if it is determined that the parallax generated between images is large, the parallax conflict frequency-estimating section 6 instructs the motion vector-detecting section 5 to perform the vector search by increasing the number of layers for the hierarchical layer search to multiple layers. Alternatively or in combination, the input image may be reduced by a larger ratio of size reduction.

The post-processing section 7 is configured to perform back-end image processing on an input digital image signal, including Bayer array interpolation, linear matrix processing, white balance adjustment, YCC conversion, color difference/gradation/contrast correction, and edge emphasis. The back-end image processing is referred to as the DBE (digital back-end) processing in contrast to the AFE processing executed by the pre-processing section 3. By executing the front-end processing and back-end processing, it is possible to generate one output image.

Further, in recent years, dynamic range enlargement for generating a wide dynamic range image by synthesizing a plurality of images, noise reduction for a plurality of images, and super-resolution processing, using a motion vector obtained by the motion vector-detecting section 5 are also classified as a type of the post processing. Information on an output image formed as one still image or a moving image is generated by these processing operations. Further, the motion vector is treated as meta information on an image, which is supplementary information on an image, or separate management information, and can be used for realizing additional functions, such as three-dimensional object reconstruction and recognition. Further, the image information processed by the post-processing section 7 is temporarily stored in a work memory implemented e.g. by a DRAM, not shown, or directly transmitted to a predetermined processing section at a subsequent stage to be expected.

Examples of the processing section at the subsequent stage include a recording section implemented e.g. by a semiconductor memory, a display section implemented e.g. by a liquid crystal display, and an external input/output interface formed by an interface (I/F) capable of connecting a wireless LAN, a wired cable, such as a USB cable, or the like.

The motion vector-detecting section 5 detects a motion vector between a plurality of frames input thereto. The motion vector-detecting section 5 calculates a motion vector between a current frame processed and input by the pre-processing section 3 immediately before, and a past frame which is once accumulated in the memory 4 and then input. The current frame and the past frame are not necessarily required to be adjacent frames. In calculation of the motion vector, a motion vector between the frames or a locus of a feature point between the frames is calculated by template matching (TM), table matching between feature points calculated in each frame, and motion vector estimation based on a gradient method, and so forth.

The motion vector-detecting section 5 changes a ratio of size reduction of the input image, and the number of layers for hierarchical layer search, and performs the motion vector search according to an instruction received from the parallax conflict frequency-estimating section 6.

First, the vector search in a simple single layer and then the motion vector search after forming layers will be described.

Figure 2A:
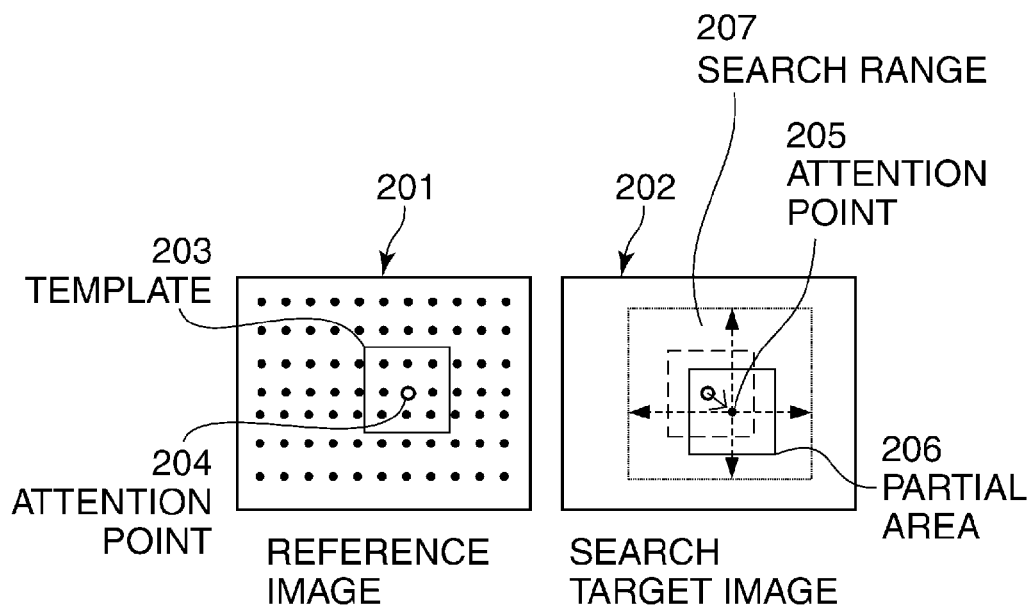

FIG. 2A is a diagram useful in explaining block matching which is one type of TM. In FIG. 2A, a left image is set as a reference image 201, and a right image is set as a search target image 202. For example, a video frame precedingly input is set as the reference image, and a current video frame input next is set as the search target image, whereby the motion vector is detected. A predetermined size of a partial area (block) set around one of attention points 204 arranged in a grid in the left image is set as a template 203. A search range 207 is set in the search target image, and the template is sequentially moved within the search range so as to search for a position at which the template best matches a partial area (block) in the search target image. The input image may be a color image, a luminance image, or a modulated image, such as a differential image. In this search, similarity between a partial area 206 set around an attention point 205 as a reference in the right image and the template 203 of the reference image is calculated. As a similarity index, a value determined by correlation calculation, such as SSD (Sum of Square Difference), SAD (Sum of Absolute Difference), and normalized cross correlation, is used. In a case where luminance largely changes between frames as in a real video image, normalized cross correlation is mainly used. A similarity score is calculated by normalized cross correlation using the following equation (1):

$$R(x, y, x', y') = \frac{\sum_{i=-M_T}^{M_T} \sum_{j=-N_T}^{N_T} \{I_{(x,y)}(i,j) - \bar{I}\}\{I'_{(x',y')}(i,j) - \bar{I}'\}}{\sqrt{\sum_{i=-M_T}^{M_T} \sum_{j=-N_T}^{N_T} \{I_{(x,y)}(i,j) - \bar{I}\}^2} \sqrt{\sum_{i=-M_T}^{M_T} \sum_{j=-N_T}^{N_T} \{I'_{(x',y')}(i,j) - \bar{I}'\}^2}} \quad (1)$$

wherein $$\bar{I} = \frac{1}{M_T N_T} \sum_{i=-M_T}^{M_T} \sum_{j=-N_T}^{N_T} I_{(x,y)}(i,j) \quad \bar{I}' = \frac{1}{M_T N_T} \sum_{i=-M_T}^{M_T} \sum_{j=-N_T}^{N_T} I'_{(x',y')}(i,j)$$

In the above equation, (x, y) and (x', y') represent the position of the template in the reference image I and the search target image I', respectively, and $I_{(x,y)}(i,j)$ and $I'_{(x',y')}(i,j)$ represent partial images, respectively.

Similarity is calculated once for each partial area 206 (each block) of the remarked pixel 205 in the search range, and as a result, as expressed by the following equation (2), the motion vector is calculated regarding the position where the similarity (e.g. correlation score) is highest as a corresponding position. If occlusion is not generated, basically, the motion vectors corresponding in number to the attention points 204 set in the reference image are calculated. Each motion vector is expressed by a vector starting from an attention point in the reference image and ending at a point corresponding thereto in the search target image.

$$(x,y,x',y')_i, i=1,\ldots,m \; (m\text{: the number of motion vectors}) \quad (2)$$

Figure 2B:
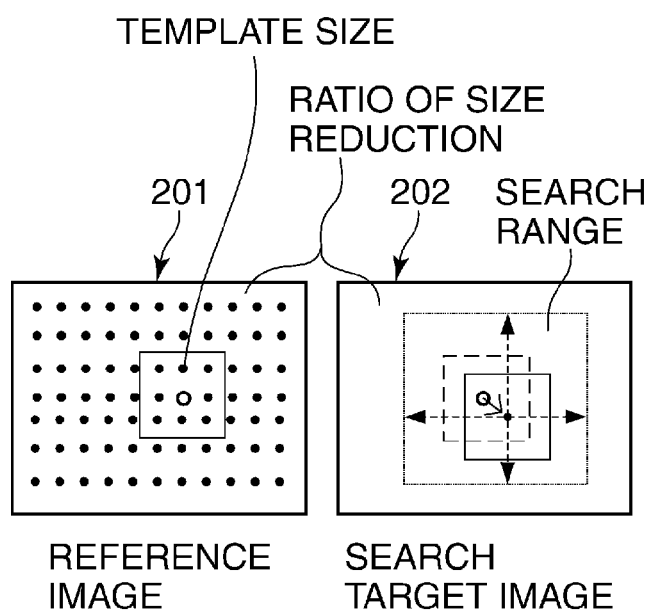

FIG. 2B is a diagram showing main controllable parameters used in the vector search.

Referring to FIG. 2B, although the search range, the template size, the ratio of size reduction, and various determination threshold values can be controlled, the search range is determined by a magnitude of a motion of an object between target images, and the template size is basically designed according to the search range.

The performance of the motion vector search can be described in terms of the searchability ratio, the outlier ratio, and the accuracy, as mentioned hereinabove. Here, the searchability ratio, the outlier ratio, and the accuracy will be described in detail with reference to FIGS. 3A1 to 3C.

FIGS. 3A1 and 3A2 are diagrams useful in explaining the searchability ratio.

The searchability ratio is a ratio of possibility of obtaining only one peak on the correlation value map. Correlation value graphs as shown in FIGS. 3A1 and 3A2 can be obtained by calculating the correlation score of each attention point within the search range. A case where only one peak is obtained corresponds to a case where a difference between a correlation value at a candidate peak of the maximum correlation score and a correlation value at a peak second to the candidate peak is sufficiently larger than a difference of the correlation value set as a threshold value, as shown in FIG. 3A1. On the other hand, a case where only one peak is not obtained corresponds to a case where a difference between a correlation value at a candidate peak of the maximum correlation score and a correlation value at a peak second to the candidate peak is not larger than the threshold value, as shown in FIG. 3A2. Thus, uniqueness of the peak of the correlation score is determined based on the threshold value set between the peak position and the next peak position, or sharpness of the peak, whereby the searchability is determined. Further, as a necessary condition for obtaining the only one peak of the correlation value, the template is required to have sufficient texture characteristics. Therefore, to eliminate vagueness in correspondence, the searchability may be determined after determining insufficiency of texture characteristics of the template using a threshold value based on e.g. a dispersion score in advance.

FIG. 3B is a diagram useful in explaining the outlier ratio.

When a vector search target image is an image obtained by photographing a planar scene parallel to a still image surface while shifting the image pickup apparatus to the lower left, it is expected to obtain the same vectors on all of the attention points, as in the most part shown in FIG. 3B. However, in FIG. 3B, a motion vector which is largely shifted from a correct vector is generated due to a search error. This is called an outlier, and the ratio of generation of the outlier is referred to as the outlier ratio. The outlier is likely to be generated in occlusion part, and in the occlusion part, an outlier is detected e.g. by bidirectional check for performing inspection by replacing the reference image 201 by the search target image 202, or threshold determination using the minimum correlation score.

FIG. 3C is a diagram useful in explaining the accuracy.

The accuracy is an index concerning deviation from a true value, which is not so large as in the case of outlier. For example, as shown in FIG. 3C, the accuracy concerns a deviation in a case where a motion vector (appearing in lower right of FIG. 3C) in a template clipped around a specific attention point includes a minute error, though not deviating so much as the outlier. The accuracy deviation is generated by parallax conflict, described hereinafter. A outlier and a non-outlier cannot be discriminated from each other during the motion vector search. They can be discriminated only by comparing a motion vector obtained by inputting an image pair corresponding to an image pair giving a motion vector of Ground Truth which is a correct value, i.e. a motion vector of an ideal correct value, with the motion vector of Ground Truth. The same is applied to a quantitative value of the accuracy. The outlier is determined by defining a determination threshold value with respect to a vector error.

Further, the accuracy is lowered by deformation due to a motion of a non-rigid body, such as a human body, a rolling shutter distortion, and distortion aberration of the optical system. When with respect to an attention point within the template, an area other than the attention point is deformed and moved and the area has a conspicuous feature, the vector search is affected by this relative movement, i.e. parallax conflict, whereby the accuracy is degraded. Naturally, as the template is larger, the vector search is more likely to be affected by the distortion and deformation, whereby the accuracy is degraded.

Further, the peak position of the similarity may be calculated with high accuracy by performing polynomial fitting on the correlation score within the search range, and the motion vector or the locus of the corresponding point may be calculated with sub-pixel accuracy by performing processing of increasing pixels of the template and the search target image.

Although the above description has been given of the example of block matching using a block on which the attention points are fixedly arranged in a grid, the vector search may be performed by extracting feature points with which respective motion vectors are easily calculated, from the reference image, and setting the positions of the extracted feature points as attention points, respectively. In extracting each attention point, an image processing filter is generally used, such as Harris operator (see C. Harris and M. Stephens, "A combined corner and edge detector", Fourth Alvey Vision Conference, pp. 147-151, 1988). By extracting a corner position of an image as a feature point, it is possible to suppress a problem of opening caused by the search at a position where an appropriate feature cannot be found, and a problem of "sliding", and thereby expect improvement of the searchability, reduction of the outlier ratio, and improvement of the accuracy.

In Harris operator, first, a window size W is determined, and a differential image ($I_{dx}$, $I_{dy}$) is calculated for a horizontal direction and a vertical direction. The differential image can be calculated using e.g. Sobel filter. For example, a 3×3 filter $h_x$ formed by setting the filter expressed by the following equation (2.5) in a lateral direction and arranging three sets of filters, and a 3×3 filter $h_y$ formed by setting the filter in a longitudinal direction and arranging three sets of filters are applied to the image to thereby obtain ($I_{dx}$, $I_{dy}$).

$$h = \lfloor 1, \sqrt{2}, 1 \rfloor (2+\sqrt{2}) \quad (2.5)$$

Then, a matrix G is calculated with respect to all coordinates (x, y) within the image using the window W by the following equation (3):

$$G = \begin{bmatrix} \sum_W I_x^2 & \sum_W I_x I_x \\ \sum_W I_x I_x & \sum_W I_y^2 \end{bmatrix} \quad (3)$$

The feature point is extracted with respect to each of the coordinates (x, y) starting with coordinates largest in the minimum singular value of the matrix G. In doing this, it is preferable that the feature points are not very dense. Therefore, a rule may be set such that feature points are not calculated any more in the vicinity of the window size W of the coordinates (x, y) from which the feature point has already been extracted.

The TM may be performed by determining the feature points again between successive frames, or may be performed between new frames by setting an end of each obtained motion vector as an attention point to thereby trace the locus of the feature point. Alternatively, table matching may be performed between the feature points calculated from each frame by using an amount of feature as key information to thereby perform associating operation. For example, it is possible to reduce redundant associating operations by making use of a pruning algorithm, which makes it possible to perform an efficient associating operation.

Figure 4:
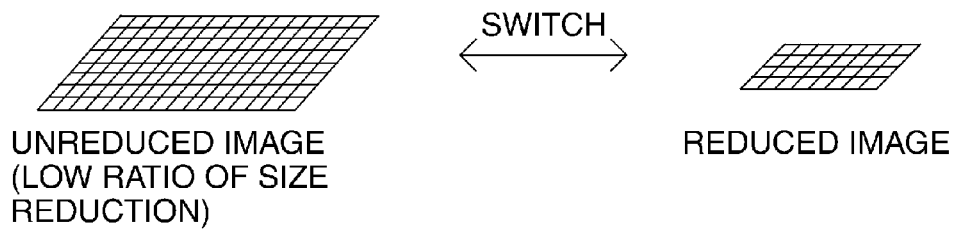
FIG. 4 is a diagram showing switching of the search between a search using an input image reduced by a low ratio of size reduction and a search using an input image reduced by a high ratio of size reduction.

In the above-described motion vector search processing, an image signal generated by the pre-processing section 3 and a past image signal accumulated in the image memory 4 are input, and the motion vector search may be directly applied to the input image signals. Alternatively, as shown in FIG. 4, after the input images are both reduced, the motion vector search processing may be applied to the reduced images. In doing this, when it is desired to make the performance of the motion vector search equivalent between images reduced by different ratios of size reduction, the template size and the search range are reduced by the same ratio according to each ratio of size reduction. By reducing the input images, it is possible to reduce the number of times of repetition of Σ, i.e. the number of times of calculating the sum of products for each of the pixels, which is commensurate with the search range and the template size. Further, when the input image is reduced, as a matter of course, the search range clipped from the image, an area of the image memory 4 for holding the image information of the template, and an area of the same for holding the correlation calculation results are accordingly reduced. As a consequence, it is possible to reduce the number of times of exchange of data signals between the motion vector-detecting section 5 and the image memory 4, and hence possibility that the data signals oppress the data bus band, not shown, is reduced.

Figure 5A:
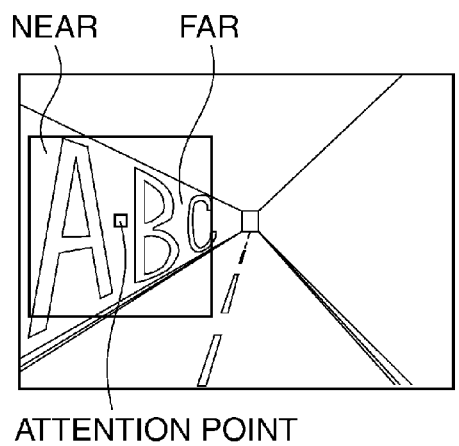
Figure 5B:
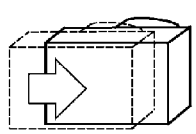

In the above-described motion vector search processing on the area basis, parallax conflict may occur due to a relationship between the template size and depth of a scene clipped by the template. Now, parallax conflict will be described in further detail. Parallax conflict refers to a state where objects which are different in generated parallax are included within the set template. More specifically, parallax conflict refers to a state where motion vectors of an image, generated when the camera is moved in parallel, are calculated in a state where both of an object at a long distance and an object at a short distance are included in the template, and a parallax of an attention point on the template cannot be correctly calculated because different parallaxes are included in the template. For example, in a case where motion vectors are taken on a wall surface extending in a depth direction as shown in FIG. 5A, if the image pickup apparatus is moved in parallel as shown in FIG. 5B, a parallax which is different in magnitude is generated for each of the objects which are different in depth. For example, in the image shown in FIG. 5A, a short distance region is dominant which has clear texture in the template and a large area at the same distance. This causes the motion vector of the attention point to have an error corresponding to a difference in parallax between the short distance region and the area of the attention point.

Figure 5C:
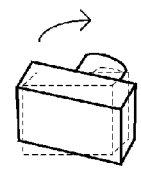

On the other hand, as shown in FIG. 5C, when the image pickup apparatus is rotated about the principal point of the optical system, by correcting the movement by projective transformation nomography before the motion vector search, a difference in the magnitude of parallax is not generated even when objects which are different in depth are included in the template. Therefore, in a case where degradation in accuracy due to parallax conflict is not caused, a template having a larger template size can give a motion vector which is hardly influenced by noise and minute deformation and has a higher accuracy. In addition, the motion vector has characteristics that when an unreduced image low in the ratio of size reduction is used, accuracy of the search thereof is improved. FIGS. 6A to 6D show a remarkable example of parallax conflict.

Figure 6A:
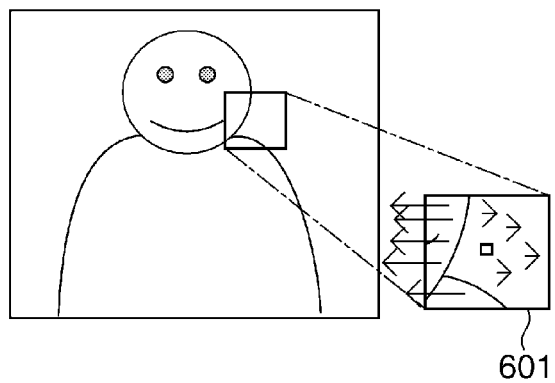
Figure 6B:
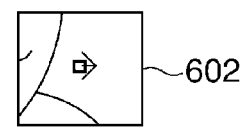
Figure 6C:
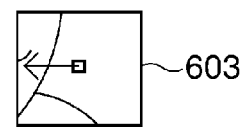
Figure 6D:
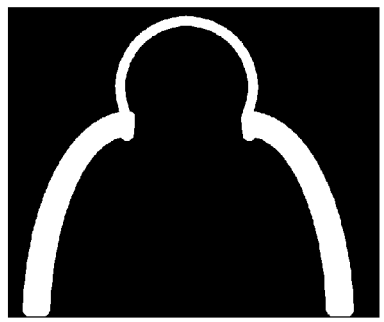

A case is considered where a difference in the magnitude of parallax is generated between a foreground and a background in an image in which a person in the foreground and the background are photographed, as shown in FIG. 6A. In such a case, if the template is set in the vicinity of the boundary between the person in the foreground and the background, conflict of motions having different parallaxes may occur in a template area denoted by reference numeral 601 in FIG. 6A. In this case, originally, the vector of the attention point corresponds to a pixel belonging to the background, and hence the vector of the attention point takes a value of a vector according to the movement of the background as appearing in the template area, denoted by reference numeral 602, in the FIG. 6B. However, in a case where the degree of texture characteristics of the foreground is high, or in a case where the boundary between the foreground and the background is clear, the vector is influenced by the foreground, and becomes a vector which is largely degraded in accuracy, or determined as an outlier according to the movement of the foreground, as appearing in the template area, denoted by reference numeral 603, in FIG. 6C. Therefore, the motion vector search gives a result including a large part containing outliers or portions degraded in parallax accuracy in the boundary of the object in the depth direction, as indicated by a white area in FIG. 6D.

As a countermeasure against the problem of parallax conflict, as described above, the hierarchical layer search is mainly used. The hierarchical layer search is a method in which the vector search is performed using a relatively large template first, the template size is gradually reduced, and finally the vector search is performed using a template which is reduced to the limit.

A hierarchy motion vector-searching unit is comprised of a pyramidal image layers hierarchy creation unit and an attention point-tracing unit. The pyramidal image layers hierarchy creation unit is configured to construct the pyramidal image layers hierarchy by setting an image reduced by a minimum ratio of size reduction, which is a base image, as a lowermost layer, and forming second, third, and subsequent images by stepwise gradual reduction. The attention point-tracing unit is configured to sequentially trace an attention point by searching the pyramidal hierarchical image layers created by the pyramidal image layers hierarchy creation unit from the uppermost layer to the lowermost layer.

The pyramidal image layers hierarchy creation unit constructs the pyramidal image layers hierarchy by reducing images e.g. by a pixel averaging method. In general, it is effective to create a three-layer or four-layer pyramid. The hierarchical images are generated by reducing images by reduction ratios of 1, 1/2, 1/4, and 1/8 with reference to the lowermost layer image which is the base image reduced by the lowest ratio of size reduction. A combination of the reduction ratios of 1, $1/\sqrt{2}$, 1/4, and 1/8 is often used.

The attention point-tracing unit traces an attention point in the pyramidal image layers hierarchy thus constructed. In doing this, the attention point-tracing unit traces the attention point from the uppermost layer toward the lowermost layer, to thereby relatively and gradually narrow the search range. Further, while the image is magnified, the template size is fixed or reduced.

Figure 7A:
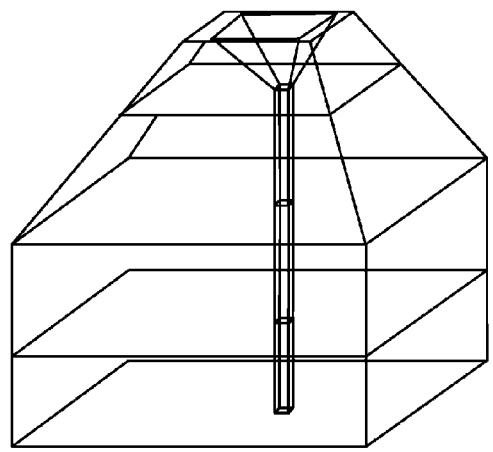

FIG. 7A is a diagram showing an example of changes in the search range in searching the pyramidal image layers hierarchy from the uppermost layer toward the lowermost layer.

In the uppermost layer, similarly to the search range in the single layer search, the search is performed within the search range determined according to a magnitude of movement between the target images. Then, in subsequent searches from the next layer to the lowermost layer, basically, it is only necessary to search only a range corresponding to an accuracy which is corrected by magnifying the image and relatively reducing the template. For example, it is only necessary to search a range of 8 or 24 pixels around a position where a peak correlation value is obtained in one upper layer of the search target image.

Figure 7B:
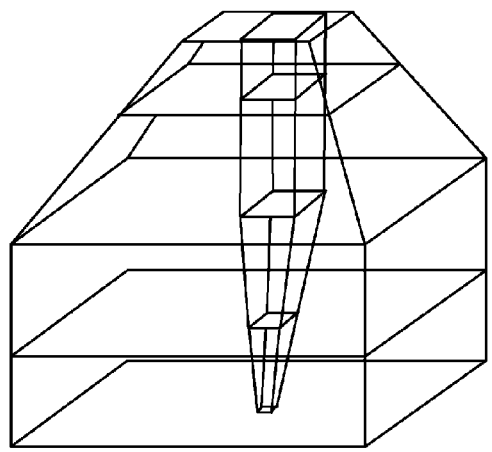

FIG. 7B is a diagram showing an example of changes in the template size in searching the pyramidal image layers hierarchy from the uppermost layer toward the lowermost layer.

During the motion vector search from the uppermost layer to the lowermost layer, by holding the template size constant, the template size is gradually reduced with reference to the base image (the size of an area on the base image corresponding to the template size is gradually reduced). Further, when the motion vector search is performed on the base image, by gradually reducing the template size, it is possible to improve accuracy of the motion vector search. Therefore, there can be mentioned a merit that by reducing the template size in the final search in the lowermost layer, it is possible to further reduce the influence of parallax conflict. Conversely, it is possible to determine the initial template size without concern for harmful effects of too large template size, e.g. degradation in accuracy due to parallax conflict. Therefore, it is possible to set a large initial template size for the search range, and thereby maintain a high searchability.

However, compared with the single layer search, it is required to provide the pyramidal image layers hierarchy creation unit as a new component, and it is impossible to ignore the influence of increase in circuit scale and memory occupation required so as to construct and hold the hierarchically-layered images, and oppression of the bus band. Therefore, in the mounting of the image pickup apparatus in an embedded device having no room for resources, a case occurs in which the motion vector search has to be realized by the search using a reduced image even in the lowermost layer in which an image reduced by the lowest ratio of size reduction is used. Further, there is a case where the motion vector search has to be performed using a reduced image so as to eliminate difficulty in execution of processing on a real-time basis due to complexity of processing. In this case, in a case where the search is performed with photographing conditions of a camera shake without no parallax conflict and the like, the hierarchical-layer matching processing for performing the search using the reduced image in the lowermost layer which is the base is sometimes inferior to the single-layer matching processing for performing the search using an unreduced image.

Further, in the hierarchical layer search, there is a case where no feature appears in the uppermost layer, but is found only after the layer to be searched is shifted to an intermediate layer, and hence the corresponding point search cannot be performed in the uppermost layer and has to be started from the intermediate layer. If the search is started from the intermediate layer, a global feature in the image field cannot be captured, and hence the search is likely to be influenced by the repetition pattern and a pattern of the planar part. This makes it impossible to obtain the expected effect in determining the only one peak, or likely to include an erroneous detection leading to an outlier, causing degradation of the performance.

Further, taking into account that theoretically, degradation in accuracy due to parallax conflict is less likely to occur in the hierarchical layer search, a mechanism for detecting that the search is being performed in an occlusion part is required to be provided in case of setting an attention point in the reference image to an occlusion part, to thereby ensure consistency in the search. To detecting an occlusion part, threshold processing on similarity values e.g. based on correlation values, bidirectional check by performing a vector search by replacing the reference image with the search target image, and so forth are performed, but the search method tends to become complicated. The hierarchical layer search in the first place, the search from an intermediate layer, the occlusion checking function, and so forth are important elements to achieve performance improvement, such as improved accuracy and reduction of outliers, in the vector search between images including large differences in the magnitude of parallax. However, under the condition that the differences in the magnitude of parallax between the images are small and hence the influence of parallax conflict is small, the vector search is influenced by non-rigid body deformation of the object and appearance of the same due to illumination, which causes erroneous detection of outliers, erroneous rejection of a correct vector, and accuracy degradation due to drift. In addition, this increases the number of parameter types, such as the template size and the search range in each layer, various determination threshold values for determining uniqueness of a correlation score and texture characteristics of the template, and the ratio of size reduction of each layer. As a result, it is very difficult to obtain expected performance by adjusting the large number of parameters. Therefore, even if the search using an unreduced image as used in the single-layer matching can be performed in the lowermost layer as the base layer, the hierarchical-layer matching processing is sometimes inferior to the single-layer matching processing, under the photographing condition of a camera shake without any parallax conflict.

To cope with this, the parallax conflict frequency-estimating section 6 estimates an occurrence degree (frequency) of parallax conflict based on the various sensing information. Then, the parallax conflict frequency-estimating section 6 provides the frequency information to the motion vector-detecting section 5 to cause the vector search method to be changed. Note that the ratio of size reduction of the input image may be changed at the same time. If it is determined that the frequency of parallax conflict occurring between the images is low, the single-layer matching (step S8021 in FIG. 8) for detecting a motion vector in the input image at a single magnification is employed as the search method. On the other hand, if it is determined that frequency of parallax conflict occurring between the images is high, the hierarchical-layer matching (step S8022 in FIG. 8) is employed, as the search method, in which motion vectors are detected by forming hierarchical images of a plurality of layers based on the input image.

Figure 8:
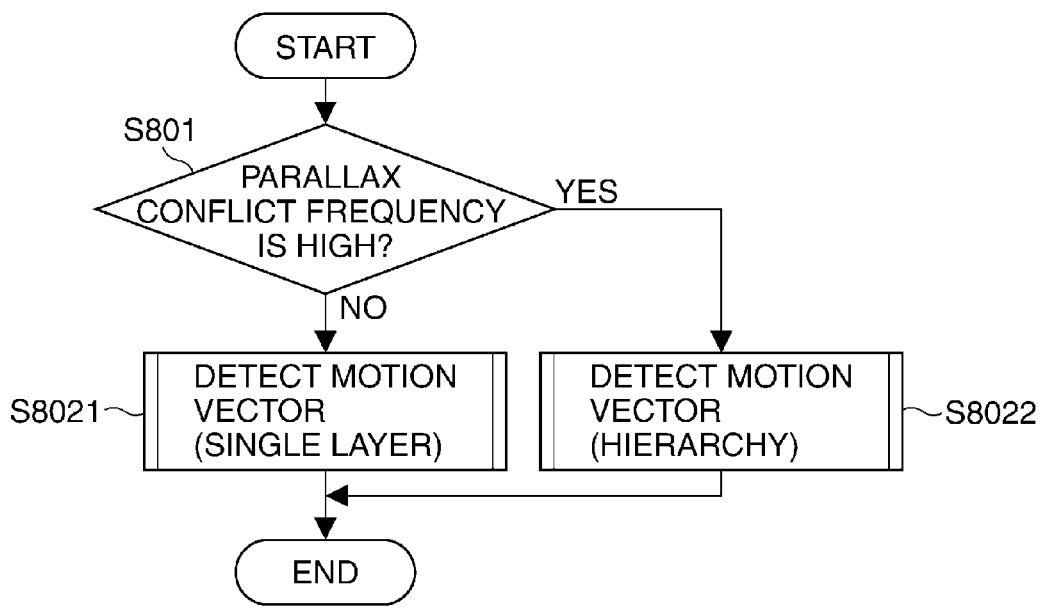
FIG. 8 is a flowchart of a motion vector-searching process including a parallax conflict frequency estimation step.

FIG. 8 is a flowchart of a motion vector-searching process including a parallax conflict frequency estimation step.

Referring to FIG. 8, the CPU 8 determines whether to perform the motion vector search by the single layer search (step S8021) or the hierarchical layer search (step S8022) based on the determination of parallax conflict frequency (step S801), and calculates motion vectors. Naturally, in each motion vector search method, the ratio of size reduction of the input image may be changed in a multi-staged manner according to a result of estimation of parallax conflict frequency.

Figure 9A:
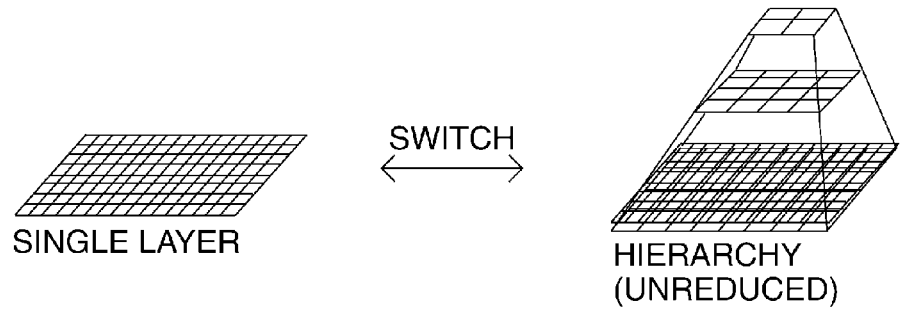
Figure 9B:
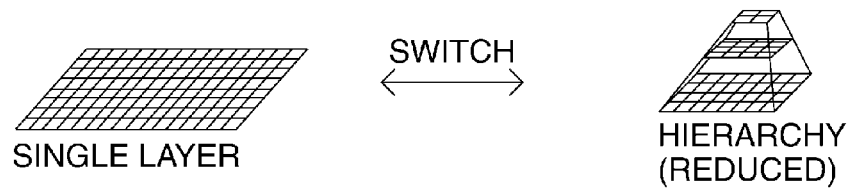

FIGS. 9A and 9B are diagrams showing switching of the search between the single layer search and the hierarchical layer search, in which FIG. 9A shows a case where the hierarchical layer search is performed using an unreduced image. On the other hand, as shown in FIG. 9B, further taking into account cost-effectiveness, if it is determined that frequency of parallax conflict generated between the images is low, by setting the ratio of size reduction of the input image to a smaller value, the hierarchical layer search is performed, whereas if frequency of parallax conflict generated between the images is high, by setting the ratio of size reduction of the input image to a larger value, the vector search may be performed by the hierarchical layer search.

The occurrence degree (frequency) of parallax on the photographed image depends on a relative positional relationship between the image pickup apparatus and an object scene, i.e. an amount of parallel movement of the image pickup apparatus relative to the object, and an object distance. As the amount of parallel movement is larger, and a distance to an object is shorter with a larger difference in distance between photographed objects, the occurrence degree of parallax becomes higher. Further, as the focal length determined depending on the zoom state is longer, a change in parallax on the image is larger. In addition, the amount of parallax changes also depending on the operating state of the image pickup apparatus, such as the level of the frame rate. For example, when the frame rate is lower, movement between the frames becomes larger, and hence the parallax becomes larger. The CPU 8 acquires the photographing conditions and the operating state of the image pickup apparatus from sensors and encoders, and holds the acquired information.

From the above, the occurrence degree of parallax can be formed into an index by the operating state of the image pickup apparatus, such as a parallel movement amount [T], a ratio between an object volume distance [V] and an object distance [I], a focal length [f], and a frame rate [fps]. The object volume distance is a difference between the farthest distance and the nearest distance from the photographed object. In addition, to consider the occurrence degree of parallax conflict, it is necessary to consider minuteness of an object having a predetermined or more depth difference. However, the depth difference and the size of the object minutely change moment by moment, and are too unstable to be set as a reference for changing processing based on threshold determination.

In view of the above, for example, the influence of minuteness of the object having a depth difference is ignored by using analogy that if the occurrence degree of parallax is high, the occurrence degree of parallax conflict is also high. This makes it possible to simplify the arrangement of components necessary for estimation, and the index is easy to be stabilized. An example of a determination index is calculated by the following equation (4):

$$X = \frac{T \cdot f \cdot V}{I \cdot fps} \quad (4)$$

It is reasoned by analogy that if an index X of the equation (4) is larger than a parallax determination threshold value $th_{parallax}$, the occurrence degree (frequency) of parallax is high, and the occurrence degree of parallax conflict is also high, and hence the search using the reduced image is performed. On the other hand, if the index X is not larger than the threshold value, it can be determined that the occurrence degree of parallax conflict is low, and hence the ratio of size reduction of the input image for the vector search is reduced, or the search using the unreduced image is performed. Further, the ratio of size reduction may be varied in a multi-staged manner by setting the threshold value in a multi-staged manner, as expressed by the following equation (5):

$$th_{parallax1} \leq th_{parallax2} \leq th_{parallax3} \leq th_{parallax4} \quad (5)$$

Therefore, to perform the estimation function, for example, the parallax conflict frequency-estimating section 6 is formed by a sensor for measuring an amount of parallel movement of the image pickup apparatus, an index value-calculating section, and a determination section. The parallax conflict frequency-estimating section 6 acquires information on the photographing conditions and the operating state of the image pickup apparatus from the CPU 8, calculates the determination index by using the equation (4), performs the determination by calculation for comparison with the parallax determination threshold value $th_{parallax}$, and estimates a level of the parallax conflict frequency.

The parallel movement amount can be obtained generally as respective vector amounts along the three axes. Therefore, an index value can also be obtained as a vector amount. The determination may be performed by setting respective threshold values in association with the three axes, or may be performed by setting threshold values in association with only two axes perpendicular to the optical axis the parallel movements along which have a large influence on the motion vector search. Further, only the parallel movement amount which has changed largely may be used for the determination. For example, the sensor for measuring the parallel movement amounts of the image is formed by a multi-axial posture sensor comprised of a sensor for movement along a rotational axis sensor and a sensor for movement along a translation axis, which are implemented by an acceleration sensor, a gyro sensor, and the like. In a case where the sensor is used only for the purpose of calculating an index, only a posture sensor concerning the translation axis, such as an acceleration sensor, may be provided. The acceleration sensor calculates a speed value and a translation amount by integrating the instantaneous value.

Further, when the image pickup apparatus shakes due to a hand shake or a walking shake, in other words, when the image pickup apparatus changes in posture, a rotational shake and a parallel movement shake of the image pickup apparatus have a positive correlation. In other words, when the rotational shake increases, the parallel movement shake also increases at a fixed ratio. The ratio of increase between the rotational shake and the parallel movement shake is different depending on an operation as a cause, such as a hand shake and a walking shake, but the rotational shake and the parallel movement shake basically have a positive correlation. Therefore, the measurement of the parallel movement amount which is to be sensed by the parallax conflict frequency-estimating section 6 may be replaced by the measurement of rotation or rotational shake amount using the rotation sensor, such as a gyro sensor. In this case, the function of the measurement sensor can be realized by e.g. a gyro sensor.

Further, in a case where the image pickup apparatus has the sensors for movement along the rotational axis and movement along the translation axis, the motion vector-detecting section 5 may perform parallelization processing on the input image using known posture change information before performing the above-described motion vector search. By performing parallelization processing, when a scene to be photographed is a still image, movement between images caused by other than parallax, which is a target to be eliminated by the present invention, can be eliminated. The parallelization processing is a general image process in which movement between images caused by other than parallax is eliminated by geometrical deformation, such as projection deformation, according to epipolar geometry, and corresponding points are moved onto the same scan line (R. Szeliski, "Computer Vision: Algorithms and Applications", p. 465). By performing this process, it is possible to more strongly exhibit the advantageous effects of the present invention.

The parallax conflict frequency-estimating section 6 may have the configuration including a photographing mode-setting unit implemented e.g. by a GUI, not shown. The parallax conflict frequency-estimating section 6 may be configured not to perform indirect estimation of occurrence frequency of parallax conflict from the camera position posture change information based on detection values output from the gyro sensor, the acceleration sensor, and the like, but to prompt the user of the image pickup apparatus to intuitively estimate the occurrence frequency of parallax conflict, and cause the photographing mode-setting unit to perform the determination. When setting the photographing mode, a photographing state, such as hand-held photographing and photographing performed while walking, and the state of holding the image pickup apparatus (state held with both hands or with one hand) may be displayed as examples, to thereby assist the user to estimate the occurrence frequency of parallax conflict. For example, if the user performs photographing by holding the camera with both hands, the occurrence frequency of parallax conflict is estimated to be low, and the vector search is performed by the single layer search. In addition, the vector search may be performed by reducing the ratio of size reduction of the input image or by using the unreduced image. On the other hand, if the user selects walking photographing by holding the camera with one hand, the occurrence frequency of parallax conflict is estimated to be high, and the vector search is performed by the hierarchical layer search. At the same time, the vector search is performed by reducing the size of the input image, as needed. Although it is not possible to adaptively cope with the photographic state in a case where the user designates the search method, if an erroneous operation of the posture sensor or the like occurs, it is possible to always perform the vector search using the search method and the ratio of size reduction of the input image, as intended by the user.

As described heretofore, according to the first embodiment, in one of different photographing conditions including camera shake and walking photographing, it is possible to select the vector search method by taking into account load (bus band oppression, power consumption, etc.) balancing with the performance (the searchability ratio and the accuracy). This makes it possible to obtain a result of the motion vector search which suppresses degradation in accuracy due to parallax conflict.

Figure 10:
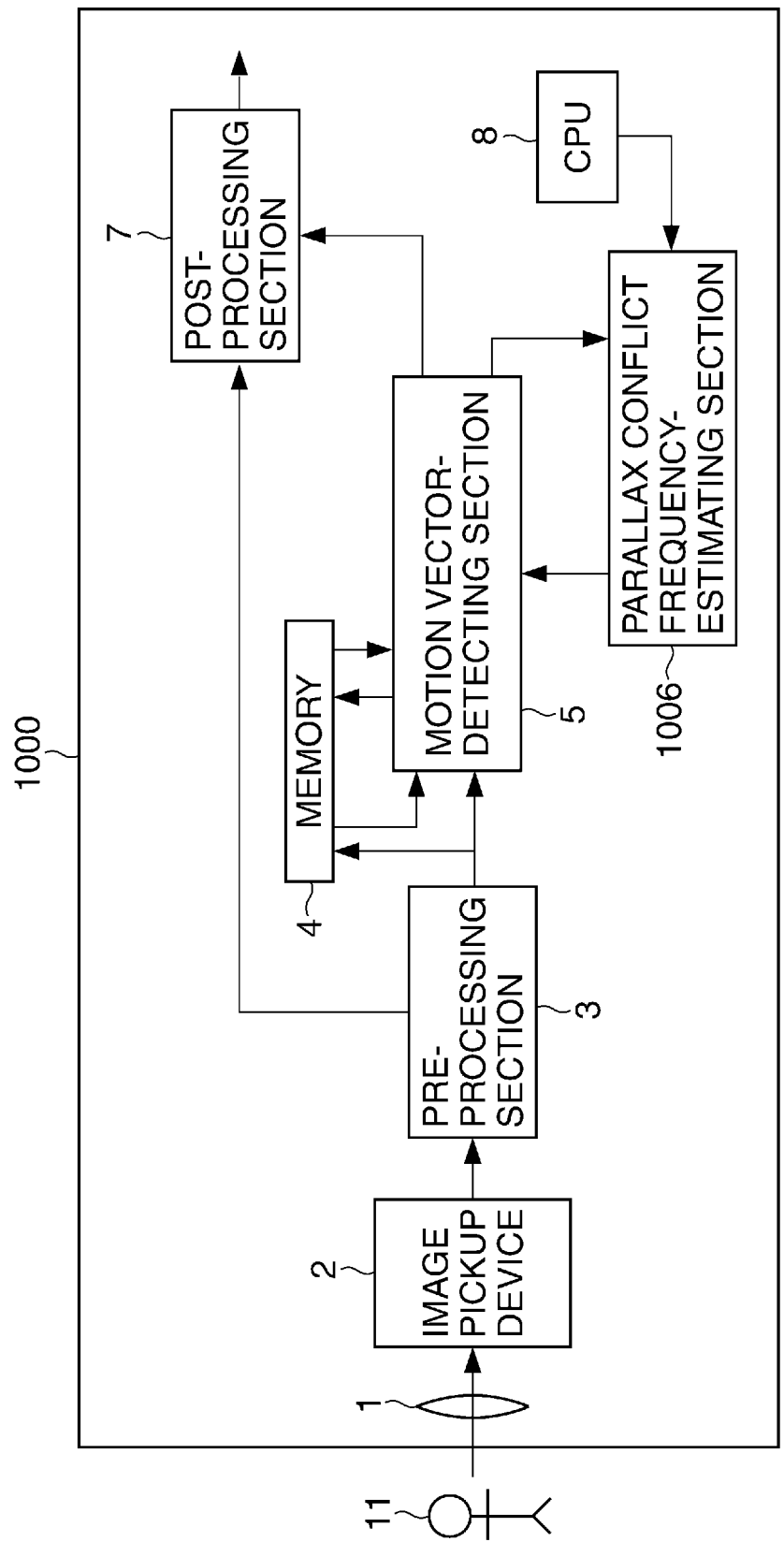
FIG. 10 is a schematic block diagram of an image pickup apparatus according to a second embodiment of the present invention.

FIG. 10 is a schematic block diagram of an image pickup apparatus according to a second embodiment of the present invention. The same component elements as those of the first embodiment are denoted by the same reference numerals, and description thereof is omitted. The following description will be only given of different points from the first embodiment.

The image pickup apparatus, denoted by reference numeral 1000, is comprised of the optical system 1, the image pickup device 2, the pre-processing section 3, the memory 4, the motion vector-detecting section 5, a parallax conflict frequency-estimating section 1006, the post-processing section 7, and the CPU 8.

The parallax conflict frequency-estimating section 1006 estimates occurrence frequency of parallax conflict based on the photographing conditions and the operating state of the image pickup apparatus, which are obtained from the CPU 8, and a result of motion vector detection performed by the motion vector-detecting section 5 immediately before.

Further, the parallax conflict frequency-estimating section 1006 is comprised of a posture change-calculating section which calculates an amount of parallel movement of the image pickup apparatus based on input motion vectors, an index value-calculating section, and a determination section. The parallax conflict frequency-estimating section 1006 acquires information on the photographing conditions and the operating state of the image pickup apparatus from the CPU 8, calculates the determination index by the equation (4), performs the determination by comparison with the parallax determination threshold value th$_{parallax}$, and estimates a level of the parallax conflict frequency.

The posture change-calculating section normalizes input motion vectors according to the photographing conditions acquired from the CPU 8, and estimates the rotation and the amount of parallel movement of the image pickup apparatus. The amount of parallel movement of the image pickup apparatus obtained based on the motion vectors on an image can be obtained only in a state combined with the object distance, and hence the parallel movement amount is separated from the object distance of the photographing conditions obtained e.g. by the AF function, not shown. Then, the determination index value for estimating the occurrence frequency of parallax conflict may be calculated by the equation (4). Alternatively, the determination index value may be calculated using the parallel movement amount [V] of the image pickup apparatus, which is combined with the object distance, by the following equation (6):

$$X = \frac{T' \cdot f \cdot V}{fps} \quad (6)$$

Similarly to the procedure described in the first embodiment, if the index X calculated by the equation (4) or (6) is larger than the parallax determination threshold value th$_{parallax}$, it is determined that the occurrence frequency of parallax conflict is also high, and the vector search using the reduced image is performed. On the other hand, if the index X is smaller than the parallax determination threshold value th$_{parallax}$, it is determined that the occurrence frequency of parallax conflict is low, and the ratio of size reduction of the input image used for the vector search is reduced or the search using the unreduced image is performed. Note that the ratio of size reduction may be changed in a multi-staged manner by setting the parallax determination threshold value th$_{parallax}$ in a multi-staged manner. Further, as the information used for the determination index value obtained from the posture change calculation, not the parallel movement amount, but a value of an estimation result of a rotational amount of the image pickup apparatus, which is high in stability of calculation, may be used as an approximate value.

Hereafter, a description will be given of a method of estimation of the rotation and the parallel movement amount of the image pickup apparatus, performed by the posture change-calculating section, using the photographing conditions and the input vector, acquired from the CPU 8.

First, to improve accuracy and stability of calculation, values of each corresponding point on a pixel coordinate system of an input frame are converted to values of the corresponding point on a normalized image coordinate system. Hereinafter, (x, y) represents pixel coordinates on the input frame, (u$_d$, v$_d$) represents normalized image coordinates including distortion, and (u, v) represents normalized image coordinates from which distortion is eliminated. The values are converted using internal parameters and distortion coefficients.

First, the coordinate values of the correspondence point are converted to the normalized image coordinates using the internal parameters by the following equation (7). In this equation, inv( ) represents an inverse matrix of a matrix ( ).

$$\begin{bmatrix} u_d \\ v_d \\ 1 \end{bmatrix} = inv\left(\begin{bmatrix} f_{c\_new}k_u & 0 & u_0 \\ 0 & f_{c\_new}k_v & v_0 \\ 0 & 0 & 1 \end{bmatrix}\right)\begin{bmatrix} x \\ y \\ 1 \end{bmatrix} \quad (7)$$

A matrix of the internal parameters is called a camera matrix K, and is expressed by the following equation (8):

$$K = \begin{bmatrix} f_{c\_new}k_u & 0 & u_0 \\ 0 & f_{c\_new}k_v & v_0 \\ 0 & 0 & 1 \end{bmatrix} \quad (8)$$

Then, as expressed by the following expression (9), distortion is eliminated by using the distortion coefficients:

$$\begin{bmatrix} u_d \\ v_d \end{bmatrix} \rightarrow \begin{bmatrix} u \\ v \end{bmatrix} \quad (9)$$

The calculation indicated by an arrow "→" in the expression (9) is realized by processing described hereafter. The distortion is eliminated by radial distortion-related equations (10) and (11):

$$K = 1 + k_1 r + k_2 r^2 + k_3 r^3 + \ldots \quad r^2 = u_d^2 + v_d^2 \quad (10)$$

$$u = u_d/K$$

$$v = v_d/K \quad (11)$$

In the above equation (10), $k_1$, $k_2$, and $k_3$ represent first order, second order, and third order distortion coefficients in a radial direction, respectively. These are distortions generated by aberration of the optical system. The distortion varies depending on the focal length of the optical system and the photographing conditions, such as the object distance. For this reason, the relations with the focal length etc. are calculated based on the design values in advance. Further, the configuration may be such that a lookup table associated with the focal length, etc. or a conversion expression associated with the focal length etc. is caused to be stored in a ROM or the like, not shown, and is read by the CPU 8 based on the photographing conditions.

Although in the present embodiment, only distortion in the radial direction is eliminated, if another distortion, such as distortion in a radius direction, is salient, another distortion elimination processing may be additionally performed.

Then, the posture change-calculating section estimates a change in posture of the camera between the frames, based on the inputs of the corrected corresponding points between the current frame and the past frame. In correction of the corresponding points, the posture change-calculating section basically performs posture estimation based on decomposition of the base matrix or posture estimation based on a pinhole camera model, such as a five-point method, on corresponding point information obtained by conversion to coordinate values on the normalized image coordinate system, to thereby estimate camera work. In general, the posture estimation based on decomposition of the base matrix is used, since it is simpler in calculation.

Figure 11:
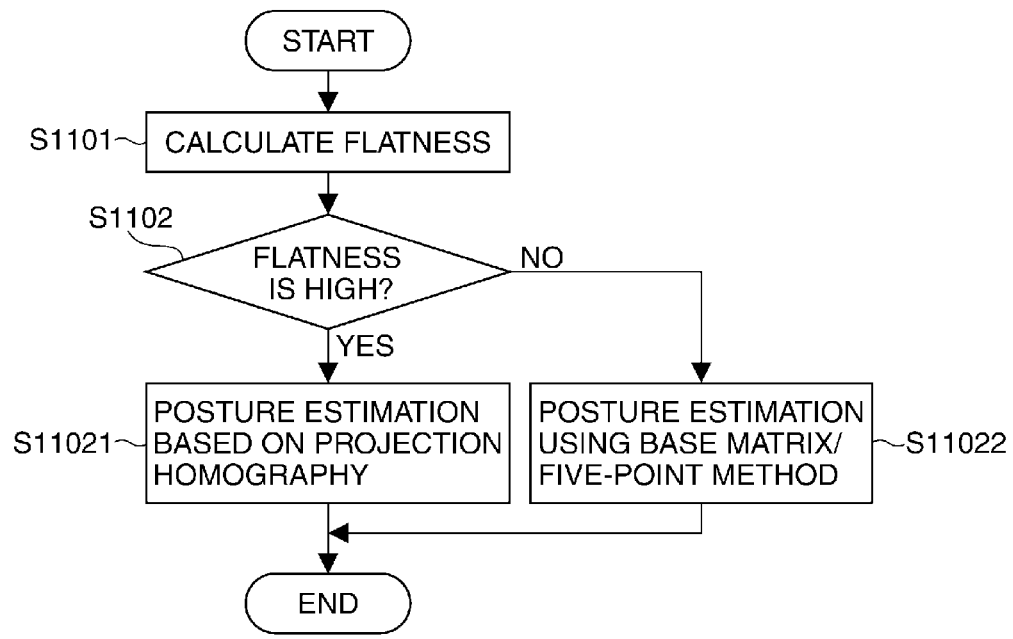
FIG. 11 is a flowchart of a process for estimating a change in position and posture of the image pickup apparatus based on a motion vector.

However, in calculation of the corresponding points, if the space arrangement in which positions for calculating the corresponding points are mapped is a special arrangement, such as arrangement on a plane, a solution cannot be obtained by the estimation method based on decomposition of the base matrix, because of degeneracy. In this case, the estimation method is changed to a method of estimating the camera posture by obtaining a projection homography and performing decomposition operation. FIG. 11 shows a process for estimating a change in position and posture of the image pickup apparatus based on motion vectors.

Referring to FIG. 11, first, the CPU 8 calculates the flatness (step S1101). The flatness is determined according to the number of conditions of a data matrix calculated from corresponding points. If it is determined that the calculated degree of flatness is not high (NO to a step S1102), the above-mentioned posture estimation based on decomposition of the base matrix or the posture estimation method based on the pinhole camera model, such as the five-point method, is performed (step S11022). On the other hand, if it is determined that the calculated degree of flatness is high (YES to the step S1102), posture estimation based on the projection homography, described hereafter, is performed (step S11021).

Next, the posture estimation based on the projection homography will be described.

Assuming that $(u_i, v_i)$ represents normalized image coordinates in the past frame, $(u_i', v_i')$ represents normalized image coordinates in the current frame, and $i=1, \ldots, m$ (m represents the number of corresponding points), there is obtained a linear equation expressed by the following equation (12) with respect to the projection homography:

$$\begin{bmatrix} 0 & 0 & 0 & -u_i & -v_i & -1 & v_i'u_i & v_i'v_i & v_i' \\ u_i & v_i & 1 & 0 & 0 & 0 & -u_i'u_i & -u_i'v_i & -u_i' \\ \vdots & \vdots & \vdots & \vdots & \vdots & \vdots & \vdots & \vdots & \vdots \\ 0 & 0 & 0 & -u_m & -v_m & -1 & v_m'u_m & v_m'v_m & v_m' \\ u_m & v_m & 1 & 0 & 0 & 0 & -u_m'u_m & -u_m'v_m & -u_m' \end{bmatrix} \begin{bmatrix} h_{11} \\ h_{12} \\ h_{13} \\ h_{21} \\ h_{22} \\ h_{23} \\ h_{31} \\ h_{32} \\ h_{33} \end{bmatrix} = 0 \quad (12)$$

This linear equation is overdetermined if the number of corresponding points m is not smaller than 8. Then, by solving the equation as a linear least squares equation, there is obtained $h = \{h_{11}, \ldots, h_{33}\}$. By converting this into a 3×3 matrix, the projection homography, i.e. an amount of change in the image between the frames is obtained by the following equation (13):

$$H = \begin{bmatrix} h_{11} & h_{12} & h_{13} \\ h_{21} & h_{22} & h_{23} \\ h_{31} & h_{32} & h_{33} \end{bmatrix} \quad (13)$$

Next, the projection homography is decomposed into camera work rotation R, a direction n of a surface on which an object of a scene is approximated, and a product t/d of a translation vector t and a depth d. Possible two solutions are calculated according to the following procedure. The projection homography is decomposed to the two solutions by using eigenvalue decomposition and singular value decomposition, and finding an invariant amount. Although various solution methods can be employed, in the present embodiment, the solution method will be described by referring to an approach used in B. Triggs, "Auto calibration from Planar Scene", ECCV 98.

The relationship between the projection homography, the camera work, and the scene arrangement is expressed by the following equation (14):

$$H = \lambda \left( R + \frac{1}{d}\vec{n}\vec{t}^T \right) \quad (14)$$

In the equation (14), R and a vector t represent rotation and parallel movement of the camera, respectively, d represents a distance to a reference surface, a vector n represents a normal line in a direction away from the camera of the reference surface, and λ represents an arbitrary constant.

In calculation based on movement between the two images, the product of the distance d on a space plane and the norm (vector t) of camera work parallel movement cannot be separated. The norm is an amount that represents the magnitude of the vector. That is, the vector t is treated as a unit directional vector norm (vector t)=1, representing a direction of parallel movement, and the distance d is treated as a product of a distance to the plane on the space and the magnitude of the parallel movement amount.

First, it is assumed that the sign of H is selected from all corresponding point vectors $x_1$ and $x_2$ on the plane such that there is satisfied the following expression (14.1):

$$\vec{x}_2^T H \vec{x}_1 > 0 \quad (14.1)$$

Singular value decomposition of H is expressed by $H=USV^T$. In this equation, U and V represent a 3×3 rotation matrix, and $S=\text{diag}(\sigma_1, \sigma_2, \sigma_3)$ represents positive descending diagonal elements $\sigma_1 \geq \sigma_2 \geq \sigma_1 \geq 0$, which is a singular value of H. Column elements of the associated orthogonal matrices U and V are expressed by $u_1, u_2, u_3$, and k.

In the present embodiment, a reference system of a first camera is employed, and a three-dimensional plane is expressed by the following equation (14.2):

$$\vec{n}^T \vec{x} = d = 1/\zeta \quad (14.2)$$

In this equation, the vector n represents a normal line in an outward direction (direction away from the camera), and $\zeta = 1/d \geq 0$ represents an inverse of the distance with respect to the plane. In this reference system, the first camera which is a virtual camera has a 3×4 projection matrix expressed by the following equation (14.3):

$$P_1 = [I_{3\times 3} | \vec{0}] \quad (14.3)$$

Then, a second camera which is a virtual camera has a projection matrix expressed by the following equation (14.4):

$$P_2 = R[I_{3\times 3} | t'] = [R | t'] \quad (14.4)$$

Note that t'=−Rt holds, in which t and t' represent parallel movement between the cameras (i.e. movement from the center of an optical axis of the first camera to the center of an optical axis of the second camera), and R represents rotation from a rotational position of the first camera to a rotational position of the second camera.

The nomography from an image 1 to an image 2 is expressed by $H = RH_1$, which is expressed by an equation (14.5) (with respect to a three-dimensional vector x on the plane, an equation (14.6) is given, because an equation (14.7) is satisfied thereon. If the vector x is treated as an arbitrary point within the image 1, what is different is only a scale factor of the whole).

$$H_1 = I_{3\times 3} - \zeta \vec{t}\vec{n}^T \quad (14.5)$$

$$H\vec{x} = R(\vec{x} - \zeta \vec{t}\vec{n}^T \vec{x}) = R(\vec{x} - \vec{t}) \approx P_2 \vec{x} \quad (14.6)$$

$$\zeta \vec{n}^T \vec{x} = 1 \quad (14.7)$$

Only a product expressed by the following expression (14.8) can be restored, and therefore, the product is normalized by $\|t\| = \|n\| = 1$ (i.e. the planar distance $1/\zeta$ is measured in units of unit length $\|t\|$). Then, to determine a possible sign, a depth positive restriction test, described hereinafter, is performed.

$$\zeta \vec{t}\vec{n}^T \quad (14.8)$$

The singular value decompositions $H = USV^T$ and $H_1 = U_1 SV^T$ are the same, including the element R. That is, $U = RU_1$ is obtained. In the homography $H_1$, an outer product vector, i.e. vector t×vector n remains unchanged. If the singular value is definite, vector t×vector n is required to correspond to the singular vector. From this, it is known that vector t×vector n always correspond to the second singular vector $v_2$. Therefore, correction normalization of H is expressed by $H \to H/\sigma_2$, i.e. $(\sigma_1, \sigma_2, \sigma_3) \to (\sigma_1/\sigma_2, 1, \sigma_3/\sigma_2)$. In the following, it is assumed that the homography H has been normalized by $\sigma_2$.

In the image frame 1, when correspondence of vector t×vector n to $v_2$ is provided, a subspace {vector t, vector n} is required to be occupied by $\{v_1, v_3\}$. That is, expressions (14.9) and (14.10) hold with respect to arbitrary parameters α and β ($\alpha^2 + \beta^2 = 1$). An arbitrary direction orthogonal to the vector n (particularly, vector n×(vector t×vector n) has a norm which is not changed by H or $H_1$.

$$\vec{n} = \beta \vec{v}_1 - \alpha \vec{v}_3 \quad (14.9)$$

$$\vec{n} \times (\vec{t} \times \vec{n}) \approx \alpha \vec{v}_1 + \beta \vec{v}_3 \quad (14.10)$$

Here, an equation (14.11) or (14.12) holds. If vector t×vector n is caused to correspond to the vector $v_1$ or $v_3$, there is no solution. Therefore, only the vector $v_2$ is possible.

$$(\alpha \sigma_1)^2 + (\beta \sigma_3)^2 = \alpha^2 + \beta^2 \quad (14.11)$$

$$(\alpha, \beta) = \left( \pm \sqrt{1 - \sigma_3^2}, \pm \sqrt{\sigma_1^2 - 1} \right) \quad (14.12)$$

Strictly, the same argument on the left side indicates the following equation (14.13).

If the vector t satisfies a characteristic vector of the characteristic value expression (14.13) of $H_1$, there is obtained an equation (14.15). Therefore, an expression (14.16) holds. After simplification, $\zeta = \sigma_1 - \sigma_3$ holds.

$$R\vec{t} = (\beta u_1 + \alpha u_3) \quad (14.13)$$

$$1 - \zeta \vec{n}^T \vec{t}^T \quad (14.14)$$

$$H\vec{t} = (1 - \zeta \vec{n}^T \vec{t})R\vec{t} \quad (14.15)$$

$$t \approx H^{-1}(R\vec{t}) \approx \beta/\sigma_1 \vec{v}_1 + \alpha/\sigma_3 \vec{v}_3 \quad (14.16)$$

The left side of the singular value decomposition of $H_1$ (the column vector $u_1$, the vector $u_2$, and the vector $u_3$ of U1) can be restored by the vector $u_2$=the vector $v_2$, and the vector t is required to be a characteristic vector of $H_1$. In this case, vector $u_1 = \gamma$vector $v_1 + \delta$vector $v_3$ and vector $u_3 = \delta$vector $V_1 - \gamma$vector $v_3$ hold, and the following expression (14.17) (after simplification) is obtained. Therefore, the rotation R is finally obtained by the following equation (15):

$$(\gamma, \delta) \approx (1 + \sigma_1\sigma_3, \pm\alpha\beta) \quad (14.17)$$

$$R = UU_1^T = U \begin{bmatrix} \gamma & 0 & \delta \\ 0 & 1 & 0 \\ -\delta & 0 & \gamma \end{bmatrix} V^T \quad (15)$$

Hereafter, a collective description will be given of a series of processing using the following expressions (16) to (24) for calculating two possible solutions of the image change amount from the camera work R comprised of rotation and parallel movement, and the scene arrangement comprised of the vector t (direction vector), the depth position d of the reference plane in the space, and the direction vector n.

$$[U, S, V] = s\ v\ d\ (H) \quad (16)$$

$$\sigma_1' = \sigma_1/\sigma_2, \sigma_3' = \sigma_3/\sigma_2 \quad (17)$$

However, $$S = \begin{bmatrix} \sigma_1 & 0 & 0 \\ 0 & \sigma_2 & 0 \\ 0 & 0 & \sigma_3 \end{bmatrix} \sigma_1 \geq \sigma_2 \geq \sigma_3 \geq 0 \quad (18)$$

$$\zeta = (1/d) = \sigma_1' - \sigma_3' \quad (19)$$

$$a_1 = \sqrt{1 - \sigma_3'^2},\ b_1 = \sqrt{\sigma_1'^2 - 1} \quad (20)$$

$$a = a_1 / \sqrt{a_1^2 + b_1^2},\ b = b_1 / \sqrt{a_1^2 + b_1^2} \quad (21)$$

$$c = (1 + \sigma_1'\sigma_3') / \sqrt{(1 + \sigma_1'\sigma_3')^2 + (\sigma_1 b_1)^2} \quad (22)$$

$$d = (a_1 b_1) / \sqrt{(1 + \sigma_1'\sigma_3')^2 + (a_1 b_1)^2}$$

$$e = (-b/\sigma_1') / \sqrt{(-b/\sigma_1')^2 + (-a/\sigma_3')^2} \quad (23)$$

$$f = (-a/\sigma_3') / \sqrt{(-b/\sigma_1')^2 + (-a/\sigma_3')^2}$$

$$\vec{v}_1 = V(:, 1), \vec{v}_3 = V(:, 3) \quad (24)$$

$$\vec{u}_1 = U(:, 1), \vec{u}_3 = U(:, 3)$$

The two possible solutions $\{R_1, \text{vector } t_1, \text{vector } n_1\}$ and $\{R_2, \text{vector } t_2, \text{vector } n_2\}$ are determined by using these expressions, as expressed by the following equations (25) to (29):

$$\vec{n}_1 = b\vec{v}_1 - a\vec{v}_3, \vec{n}_2 = b\vec{v}_1 - a\vec{v}_3 \quad (25)$$

$$R_1 = U \begin{bmatrix} c & 0 & d \\ 0 & 1 & 0 \\ -d & 0 & c \end{bmatrix} V^T, R_2 = U \begin{bmatrix} c & 0 & -d \\ 0 & 1 & 0 \\ d & 0 & c \end{bmatrix} V^T \quad (26)$$

$$\vec{t}_1 = -(b\vec{u}_1 + a\vec{u}_3), \vec{t}_2 = -(b\vec{u}_1 - a\vec{u}_3) \quad (27)$$

wherein $P_2 = [R|t]$ holds.

A promise in which an orientation vector $\vec{n}$ is outward (depth positive restriction) is introduced into the set of these solutions.

if $(\vec{n}_1(3) < 0) \vec{t}_1 = \vec{t}_1, \vec{n}_1 = -\vec{n}_1$ (28)

if $(\vec{n}_2(3) < 0) \vec{t}_2 = -\vec{t}_2, \vec{n}_2 = -\vec{n}_2$ (29)

By thus making the signs consistent, the two possible solutions are calculated. Thereafter, epipolar error check is performed, and one solution having a small error is extracted.

The epipolar error check is performed in the following manner: An epipolar error is calculated using the corresponding points with respect to a set of the two possible solutions $\{R_1, \text{vector } t_1/d, \text{vector } n_1\}$ and $\{R_2, \text{vector } t_2/d, \text{vector } n_2\}$ of the posture change and the scene information, obtained by decomposing the nomography determined based on the corresponding point vectors $x_1$ and $x_2$. The epipolar error is expressed by the following equation (30):

$$e_i = \Sigma_j^n (\vec{x}_{2j}^T ([\vec{t}_i]_x R_i) \vec{x}_{1j}), i=1,2, j=1,2,\ldots,n \quad (30)$$

In the above equation, n represents the number of the corresponding points. A solution having a small error is selected as the true solution. As a consequence, the only one solution of {R, vector t, vector n, d} expressing the camera work between the input frames is determined.

Although the description is omitted, the posture estimation based on the base matrix which is a method of estimating the posture of the camera with respect to the non-planar scene and the posture estimation by the five-point method based on the pinhole camera model can be realized by methods based on known techniques, described in R. Hartley, A. Zisserman, "Multiple View Geometry in Computer Vision", Cambridge Univ. Press (2000), and Bill Triggs, "Routines for Relative Pose of Two Calibrated Cameras from 5 Points", Documentation, INRIA. Juillet 2000, respectively.

Although in the description of estimation of the rotation and the parallel movement amount of the image pickup apparatus performed by the posture change-calculating section, the method of estimating the rotation and the parallel movement amount based on only the information on the photographing condition and the input vector has been described, in a case where the parallax conflict frequency-estimating section 1006 includes a posture sensor, the posture sensor may be also used for estimation of the posture change. For example, the rotation information of the image pickup apparatus between the frames, which is determined by integrating the values output from the gyro sensor, is regarded as the rotation information in the equation (14), and a change in motion vector between frames, i.e. a change in image caused by rotation of the image pickup apparatus is corrected, i.e. canceled out first with respect to a change in the motion vector between the frames, i.e. a change in the corresponding points. Then, fitting may be performed on the changes. Thus, the amount of parallel movement of the image pickup apparatus may be estimated in a state where there is no parallel movement sensor information.

Further, the rotation information of the image pickup apparatus between the frames, determined by integrating the values output from the gyro sensor, is set as the initial value of the rotation in the equation (14). Then, by executing fitting on changes in the motion vectors between the frames, i.e. changes in the corresponding points, the rotation information of the image pickup apparatus may be estimated with high accuracy, in addition to the parallel movement amount in the state without the sensor information (B. Triggs, "Auto calibration from Planar Scene", ECCV 98). When noise, such as quantization noise, has a large influence, the combined use of the initial value having high reliability improves the system performance and stability.

Similarly, the rotation information of the image pickup apparatus between the frames, determined by integrating the values output from the gyro sensor, is set as the initial value of the rotation in the equation (14). Then, the parallel movement amount of the image pickup apparatus between the frames, determined by integrating the values output from the acceleration sensor, is set as the initial value of the parallel movement amount in the equation (14). By executing fitting on changes in the motion vector between the frames, i.e. changes in the corresponding points, the rotation and the parallel movement amount of the image pickup apparatus may be estimated with higher accuracy than the sensor performance.

As described heretofore, according to the second embodiment, even in different photographing conditions including camera shake and walking photographing, it is possible to select the vector searching method and the ratio of size reduction of a target image, taking into account load (bus band oppression, power consumption, etc.) balancing with the performance (the searchability ratio and the accuracy). As a consequence, it is possible to obtain a result of the motion vector which suppresses degradation in accuracy caused by parallax conflict.

Although the above-described corresponding point-searching function of the image pickup apparatus can be realized by the hardware having the respective functions, the corresponding point-searching function can also be realized by software. When the function is realized by software, an image forming apparatus having programs constituting the software installed in dedicated hardware may realize the function. Further, the function can be realized using a computer, or e.g. a general personal computer which can realize various functions by installing various programs from a storage medium or a network. For example, the corresponding point search can be realized by recording a video photographed by an image pickup apparatus in a manner synchronized with information on photographing conditions and the operating state of the image pickup apparatus detected when the video has been photographed, and the posture sensor information, and using the recorded information for the processing of the program executed by the image processing apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-239806 filed Nov. 20, 2013, which is hereby incorporated by reference herein in its entirety.

What is claimed is:

1. An image pickup apparatus including a motion vector detection unit configured to have one of two or more input images photographed through an optical system input as a reference image, and another input image input as a search target image, and detect, with respect to a block having a predetermined size and formed by a plurality of pixels set in the reference image, a motion vector in the block from the search target image, comprising:
   a calculation unit configured to calculate a determination index associated with frequency of occurrence of parallax conflict which is a state in which objects having different parallaxes are included in a template set to the input image,
   wherein in a case where the determination index calculated by said calculation unit is not larger than a threshold value, said vector detection unit selects a first detection method for detecting a motion vector using a first number of layers, whereas in a case where the determination index is larger than the threshold value, said vector detection unit selects a second detection method for detecting a motion vector using a second number of layers, the second number being larger than the first number.

2. The image pickup apparatus according to claim 1, wherein said motion vector detection unit switches the vector detection method between a first detection method for detecting a motion vector in a single-magnification input image, and a second detection method for detecting a motion vector in a hierarchically-layered image formed by a plurality of layers which are differentiated in ratio of size reduction, using the input image as a base.

3. The image pickup apparatus according to claim 1, wherein said calculation unit calculates the determination index based on information on photographing conditions and an operating state of the image pickup apparatus.

4. The image pickup apparatus according to claim 3, wherein the photographing conditions include a focal length or an object distance, and
   wherein the operating state of the image pickup apparatus includes a zoom state, and a frame rate used in moving image photographing.

5. The image pickup apparatus according to claim 1, wherein said calculation unit calculates the determination index based on information on photographing conditions and an operating state of the image pickup apparatus, and a result of detection performed immediately before by said motion vector detection unit.

6. The image pickup apparatus according to claim 1, wherein said calculation unit calculates the determination index by estimating an amount of parallel movement of the image pickup apparatus according to the photographing conditions with respect to a motion vector input from said motion vector detection unit, and separating an object distance of the photographing conditions from the amount of parallel movement.

7. The image pickup apparatus according to claim 1, wherein said calculation unit receives an input of frequency of occurrence of parallax conflict, estimated by a user.

8. An image processing apparatus including a motion vector detection unit configured to have one of two or more input images photographed through an optical system input as a reference image, and another input image input as a search target image, and detect, with respect to a block having a predetermined size and formed by a plurality of pixels set in the reference image, a motion vector in the block from the search target image, comprising:

a calculation unit configured to calculate a determination index associated with frequency of occurrence of parallax conflict which is a state in which objects having different parallaxes are included in a template set to the input image, wherein in a case where the determination index calculated by said calculation unit is not larger than a threshold value, said vector detection unit selects a first detection method for detecting a motion vector using a first number of layers, whereas in a case where the determination index is larger than the threshold value, said vector detection unit selects a second detection method for detecting a motion vector using a second number of layers, the second number being larger than the first number.

9. A method of controlling an image pickup apparatus including a motion vector detection unit configured to have one of two or more input images photographed through an optical system input as a reference image, and another input image input as a search target image, and detect, with respect to a block having a predetermined size and formed by a plurality of pixels set in the reference image, a motion vector in the block from the search target image, comprising:

calculating a determination index associated with frequency of occurrence of parallax conflict which is a state in which objects having different parallaxes are included in a template set to the input image; and causing the vector detection unit to select, in a case where the determination index is not larger than a threshold value, a first detection method for detecting a motion vector using a first number of layers, whereas in a case where the determination index is larger than the threshold value, a second detection method for detecting a motion vector using a second number of layers, the second number being larger than the first number.

10. A non-transitory computer-readable storage medium storing a computer-executable program for executing a method of controlling an image pickup apparatus including a motion vector detection unit configured to have one of two or more input images photographed through an optical system input as a reference image, and another input image input as a search target image, and detect, with respect to a block having a predetermined size and formed by a plurality of pixels set in the reference image, a motion vector in the block from the search target image, wherein the method comprises:

calculating a determination index associated with frequency of occurrence of parallax conflict which is a state in which objects having different parallaxes are included in a template set to the input image; and causing the vector detection unit to select, in a case where the determination index is not larger than a threshold value, a first detection method for detecting a motion vector using a first number of layers, whereas in a case where the determination index is larger than the threshold value, a second detection method for detecting a motion vector using a second number of layers, the second number being larger than the first number.

* * * * *